(12) United States Patent
Berjeron

(10) Patent No.: US 9,984,605 B2
(45) Date of Patent: May 29, 2018

(54) WEARABLE DISPLAY

(71) Applicant: Sherry Berjeron, Hillsboro Beach, FL (US)

(72) Inventor: Sherry Berjeron, Hillsboro Beach, FL (US)

( * ) Notice: Subject to any disclaimer, the term of this patent is extended or adjusted under 35 U.S.C. 154(b) by 39 days.

(21) Appl. No.: 15/381,103

(22) Filed: Dec. 16, 2016

(65) Prior Publication Data
US 2018/0122280 A1 May 3, 2018

Related U.S. Application Data

(60) Provisional application No. 62/413,943, filed on Oct. 27, 2016.

(51) Int. Cl.
G09G 3/00 (2006.01)
G06F 3/02 (2006.01)
G06F 1/16 (2006.01)

(52) U.S. Cl.
CPC ............ G09G 3/005 (2013.01); G06F 1/163 (2013.01); G06F 3/02 (2013.01); G09G 2354/00 (2013.01)

(58) Field of Classification Search
CPC .................................................. G09G 3/005
USPC .......................................................... 345/31
See application file for complete search history.

(56) References Cited

U.S. PATENT DOCUMENTS 5,057,827 A * 10/1991 Nobile ...................... G09F 9/33
345/31
5,791,966 A * 8/1998 Capps ...................... A63H 1/24
362/249.16
6,193,384 B1 * 2/2001 Stein ...................... F04D 25/088
362/812

(Continued)

OTHER PUBLICATIONS

Shenzhen Fire-Wolf Electrontics Co., LTD, NFC LED message fan, Jun. 3, 2016, https://www.led-sticks.com/shop/usb-led-message-fan-phone-program-usb-led-fan-self-programmable-led-message-usb-fan/ (Year: 2016).*

Primary Examiner — Jason C Olson

(57) ABSTRACT

A system for an adult costume toy for entertainment. The system composes at least one cone; a plurality of LED lights configured to be controlled by a microprocessor; at least one motor coupled to a propeller; a memory; at least one battery configured to supply power to the motor, LED lights, microprocessor and memory; at a plurality of user interface buttons configured to receive a plurality of user input. The memory comprises a computer-readable-medium having computer-executable program stored therein that, when executed by the microprocessor, cause the microprocessor to, to control the rotation of the motor and lighting of the plurality of LED to generate a projection of the message on the rotating propeller based on the plurality of user inputs. The plurality of LED lights, the memory and microprocessor, and the motor are housed in a cone shaped housing. The further inventive aspects can be embodied in the adult costume toy wherein the buttons consist on/off switch con- (Continued)

trol, a letter input, and a number input for customizing messages. The other inventive aspects can be embodied wherein the one or more cones augment a portion of the torso and include one or more LED lights providing one or more lovable or provocative messages on the propeller and the least one propeller spins on the at least one cone.

4 Claims, 2 Drawing Sheets

(56) References Cited

U.S. PATENT DOCUMENTS

| | | | | |
|---|---|---|---|---|
| 6,265,984 B1* | 7/2001 | Molinaroli | | A63H 33/40 |
| | | | | 340/815.4 |
| 7,030,420 B2* | 4/2006 | Shimomura | | G09F 9/33 |
| | | | | 257/88 |
| 7,161,256 B2* | 1/2007 | Fang | | H02K 7/1807 |
| | | | | 290/1 R |
| 7,179,149 B2* | 2/2007 | Chernick | | A63H 33/22 |
| | | | | 417/234 |
| 7,236,146 B2* | 6/2007 | Smedley | | G09F 9/33 |
| | | | | 340/815.4 |
| 7,397,387 B2* | 7/2008 | Suzuki | | G09G 3/005 |
| | | | | 340/815.4 |
| 8,106,854 B2* | 1/2012 | Chui | | G09G 3/005 |
| | | | | 345/30 |
| 8,866,703 B2* | 10/2014 | Weiss | | G06F 3/03545 |
| | | | | 345/183 |
| 9,186,595 B1* | 11/2015 | Cannon | | A63H 33/22 |
| 9,895,620 B1* | 2/2018 | Walterscheid | | A63H 1/24 |
| 2002/0005826 A1* | 1/2002 | Pederson | | B60Q 1/2611 |
| | | | | 345/82 |
| 2004/0100422 A1* | 5/2004 | Greenyer | | G06F 3/14 |
| | | | | 345/30 |
| 2007/0281581 A1* | 12/2007 | Rago | | A63H 1/24 |
| | | | | 446/242 |
| 2008/0186155 A1* | 8/2008 | Spencer | | G02B 27/2285 |
| | | | | 340/438 |
| 2008/0213094 A1* | 9/2008 | Okimura | | F04D 25/088 |
| | | | | 416/5 |
| 2010/0213880 A1* | 8/2010 | Chien | | G09F 9/33 |
| | | | | 315/317 |
| 2012/0013575 A1* | 1/2012 | Sledge | | G06F 3/0386 |
| | | | | 345/175 |
| 2012/0212712 A1* | 8/2012 | Scanlon | | G03B 21/562 |
| | | | | 353/121 |
| 2014/0091942 A1* | 4/2014 | Matloff | | G06T 11/203 |
| | | | | 340/815.53 |
| 2014/0152672 A1* | 6/2014 | Seder | | G09G 3/005 |
| | | | | 345/473 |
| 2015/0131326 A1* | 5/2015 | Chien | | F21S 8/035 |
| | | | | 362/642 |

\* cited by examiner

WEARABLE DISPLAY

This application claims priority to the U.S. Provisional Patent Application No. 62/413,943 filed on Oct. 27, 2016, which is incorporated herein in its entirety by reference.

FIELD

Example embodiments described herein generally relate to costume entertainment that incorporates a display.

BACKGROUND

Conventional costume systems or methods are directed to apparel. The present disclosure generally relates to apparatuses worn by users or to a costume toy that arouses interest or emotion using display designs, slogans, pictures, of other like types of display. More particularly, the disclosure relates to apparatus used to entertain and make people laugh, happy, aroused, playful, or silly.

Display apparatuses of various kinds are widely used to display information or to promote various materials to the public. Different types of displays can be utilized including billboards, signs, banners, decals, pins, bumper stickers, and the like. The information included on such display apparatuses include designs, slogans, advertisements, messages, and pictures. Such apparatuses are commonly used by commercial entities, political organizations, charitable organizations, educational institutions, and other large entities to promote various causes and endeavors. Individual persons or smaller entities also create, use, and distribute display apparatuses for such reasons.

Wearable display apparatuses are one type of display apparatus that are commonly used with several advantages. One advantage is that most apparatuses are small and therefore easy and convenient to use. Once the display apparatus is affixed to a user, it can potentially attract viewers wherever tire user carries it. The public can view the apparatus while the wearer participates in normal daily activities, such as when talking to neighbors or friends, going shopping, walking down a street or through a public area, etc.

Display apparatuses are usually affixed to a user in a manner intended to display information to the public. However, wearable display apparatuses and the accompanying designs are often not be sufficiently noticeable achieve the desired degree of attention from the public. Such lack of appeal often results from a lack of creative design; unattractive design detail; large complex and bulky configurations; and other like shortcomings. Such unnoticeable or bland designs may prevent the display apparatuses from attracting attention and thus undermine the purpose of such display apparatuses particularly where a significant amount of time and resources are employed in creating and distributing the apparatus. Thus, display apparatuses are desirable that attract viewers while being portably attached to a user. Such apparatus can be used to entertain and excite viewers at various occasions including parties, events, performances, personal residences, bedrooms, and any other place. The prior-art does not disclose entertaining or alluring materials for adults including petite sized cones to enhance the shape of body parts while presenting lovable sayings and suggestions using a LED display apparatus.

Therefore, a need exists for a new and improved a costume toy that would provide the above-mentioned benefits. In this regard, the present disclosure substantially fulfills this need. The costume toy according to the present disclosure substantially departs from the conventional concepts and designs of the prior art, and in doing so provides an apparatus primarily developed for the purpose of entertaining and alluring a user using petite sized cones provided with LED lights.

SUMMARY

The inventive aspect described in the specification can be embodied in a system for an adult costume toy that entertains comprising petite sized cones; LED lights; at least one motor; at least one battery; at least one propeller; at least one cone, a microprocessing chip; at least four buttons; and one or more clips; wherein the microprocessing chip includes one or more programs to display words or sayings on a rotating propeller. The further inventive aspects can be embodied in the adult costume toy wherein the buttons consist of: on/off control; a letter input, and a number input for customizing messages. The other inventive aspects can be embodied wherein the one or more cones augment a portion of the torso and include one or more LED lights providing one or more lovable or provocative messages on the propeller and the least one propeller spins on the at least one cone. Yet other inventive aspects can be embodied wherein the battery powers a motor for the propeller and LED lights and the message for the display is programmed to display a new message using the one or more buttons.

Thus, the inventive aspect described in the specification can also be embodied in a costume toy that entertains and makes people laugh, happy, aroused, playful, and silly at parties, events, performances, personal residences, in bedrooms, and just about anywhere. The other inventive aspects can be embodied in a costume toy comprising at least two petite sized cones that augment the shape of the breast and further comprise LED lights with lovable sayings and or sexy suggestions. Yet other inventive aspects can be embodied in an adult costume toy comprising a propeller which when turned on the breast cone makes people laugh with special sayings from endearing and loving to sensuous and provocative.

Yet another object of the present disclosure is to provide a costume adult toy that is designed to provoke various reactions using programmable words or like such as "I Love You, I am Crazy for you, Give me a kiss".

Yet another object of the present disclosure is to provide a costume adult toy that provides a resolution to communicate sorry feelings. Such communicate language include "I am Sorry or Please Forgive Me" etc.

Still yet another object of the present disclosure is to provide a costume adult toy that comprises at least one motor, at least one battery, at least one propeller, at least one cone which include plastic adhesive and clips that are used to fix at least one cone on a surface of clothes.

Still yet another object of the present disclosure is to provide a costume adult toy with a battery powered propeller or motor and LED lights, which are controlled with a processor chip to program words or sayings that are displayed on the costume, and more particularly, displayed by the propeller.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of other embodiments and of being practiced and carried out in various ways. Also, it is to be understood that the phraseology and technology employed herein are for the purpose of description and should not be regarded as limiting.

These together with other objects of the disclosure, along with the various features of novelty which characterize the disclosure, are pointed out with particularity in the disclosure. For a better understanding of the disclosure, its operating advantages and the specific objects attained by its uses, reference should be had to the accompanying drawings and descriptive matter in which there are illustrated preferred embodiments of the disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DETAILED DESCRIPTION

Figure 1:
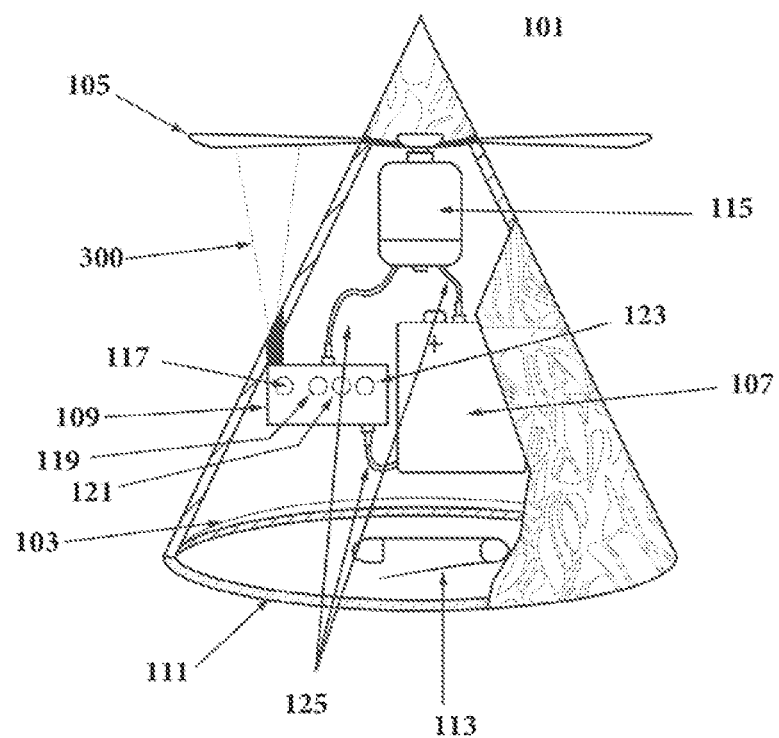
FIG. 1 shows a front view of the cone and propeller and various, other components, according to an example embodiment.

In the following description, reference is made to the accompanying drawings which form a part hereof, and in which is shown by way of illustration specific embodiments in which the inventive concept may be practiced. These embodiments are described in sufficient detail to enable those skilled in the art to practice the inventive concept, and it is to be understood that the embodiments may be combined, or that other embodiments may be utilized and that structural and logical changes may be made without departing from the spirit and scope of the present inventive concept. The following description is, therefore, not to be taken in a limiting sense.

Example embodiments of the inventive concepts may be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, some dimensions are exaggerated for clarity.

The terminology used herein is for the purpose of describing particular embodiments only and is not intended to be limiting of example embodiments of the inventive, concepts. As used herein, the singular forms "a," "an" and "the" are intended to include the plural forms as well, unless the context clearly indicates otherwise. It will be further understood that the terms "comprises", "comprising". "includes" and/or "including," if used herein, specify the presence of stated features, integers, steps, operations, elements and/of components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 shows a front view of the cone and propeller and various other components, according to an example embodiment. FIG. 1 shows a cone 101 with concave bottom 103, propeller 105, battery 107, LED lights/device 109, adhesive 111, and a safety pin 113. The system also includes a motor 115 to power the propeller 103. The system may be controlled with four buttons including: on/off, control 119 letters input 121, and a number input 123. The system may be connected with conventional wire and electrical systems 125 known in the art.

Figure 2:
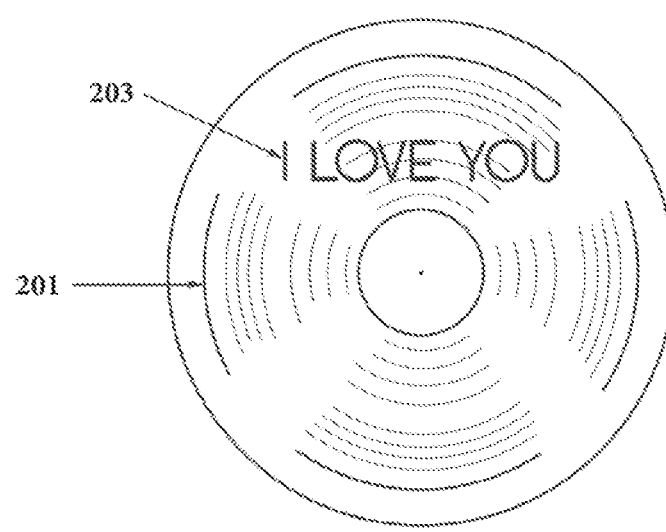
FIG. 2 shows a side view of the propeller spinning and display message, according to an example embodiment.
Figure 3:
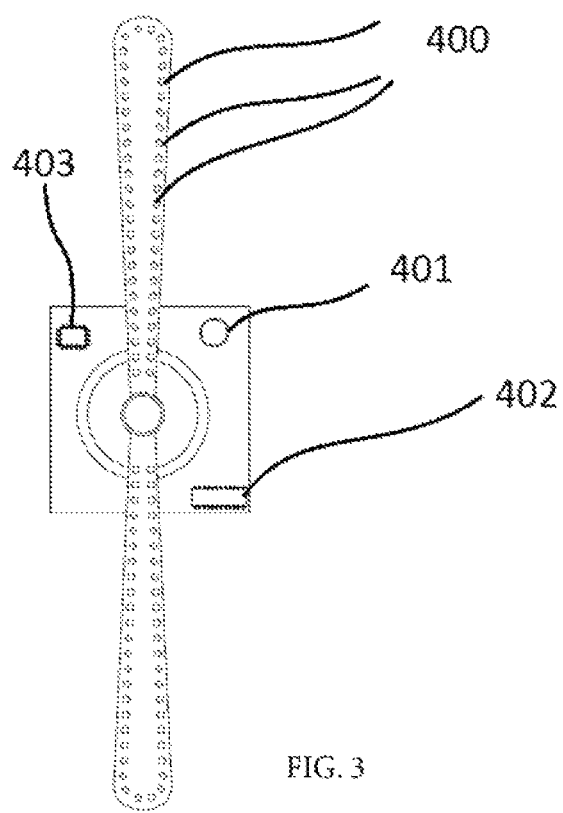
FIG. 3 shows a top view of the propeller with a plurality of LEDS, according to another example embodiment.

FIG. 2 shows a side view of the propeller spinning, according to an example embodiment. FIG. 2 illustrates a spinning propeller with a LED device projecting the message "I LOVE YOU". The device may project any message desired by a user including messages that are loving, sensuous, and other like messages.

In an embodiments, the current disclosure is directed to an adult costume toy that entertains to provoke laughter, playfulness, arousal, or silliness at parties, events, performances, personal residences, in bedrooms, or just about anywhere. In one embodiment, the adult costume toy comprises at least two petite sized cones that may augment part of the torso, such as the shape of the breast, and may further comprise LED lights placed in a LED device box that controls the display with loving sayings and/or sexy, exciting, or stimulating suggestions. Further, the costume toy comprises a propeller which when turned on the breast cone may create amusement or laughter with one or more special sayings ranging from endearing and loving to sensuous and provocative. The adult costume toy of the current disclosure gives people emotions and feelings by displaying sayings/ words like "I Love You", "I am Crazy for you", or "Give me a kiss." Furthermore, the toy may include means to engender forgiveness in an endearing manner by including such sayings "I am Sorry" or "Please Forgive Me" with the propeller flashing the message.

In an example embodiment, a base diameter of the breast cone can be anywhere between 6 cm to 20 cm and the height of the breast cone can be anywhere between 7 cm to 25 cm.

The components of the adult costume toy of the current disclosure comprise at least one motor, at least one battery, at least one propeller, at least one cone comprising plastic adhesive and clips to be used to affix the at least one cone on clothes. Further, a battery may be used to power LED lights and a small chip to program the words or sayings that will be displayed on the costume. The battery also powers a motor that may power LED lights as well as move the propeller.

In one embodiment, a method of use may comprise: opening a package with the adult toy; taking toy out and removing adhesive tape; pressing the toy on a user's breast; turning a switch on to cause a spinning of a propeller and a lighting up of the LED lights which display messages like "I love you". In an embodiment, the toy may be made more conservative by attaching them on clothes for public venues available in different designs to fit all holidays.

In one embodiment, three red buttons may be located on the LED device box to control, the message displayed via the LED lights on the fan. The plurality of buttons may include: Button 1: On/Off; Button 2: Control; Button 3: ABC; Button 4: 123

On one embodiment, the toy may be configured to perform as follows: the "CONTROL" button may be pushed and held leading to the display of a cursor on the fan blade;

the ABC (letters) button may be pressed to scroll through the alphabet; the 123 (numbers) button may be pressed to scroll through the symbols and numbers; the control button may be pressed once the user has decided on a letter and to move to the next letter/space; and finally, the control button may be pushed and held for two seconds to finalize the message. Furthermore, a new message can be programmed by pressing and holding the control button leading to a fan blade appearing as blank, then repeating the steps listed above.

In one embodiment, the toy provides an option of at least, one message program for selecting at least one message per unit. In an embodiments, the toy may be easily and efficiently manufactured and marketed and is of durable and reliable construction. Furthermore, the adult costume toy of current disclosure is economically affordable and available for relevant market segments of the purchasing public.

In an example embodiment, the LED device 109 projects programmed projection light 300 into a rotating propeller which enables the visibility of the projected light to display messages as programmed by the user.

The example embodiments are not limited the above description. In another example embodiment, the propeller itself may include a plurality of the LED lights 400 attached on the front side of the propeller. The LED lights are controller by a microcontroller 402 attached to the propeller itself. A transceiver 403 receives the programming command from a user witlessly and communicates the command to the controller 402 to control the Lighting of the LED lights 400 and the rotation of the propeller (fan blade) to display a desired message, image or picture.

In yet another example embodiment, the plurality of LED devices are positioned in an array and the lighting of the individual LED and rotation of the propeller may be controlled for the message generation and visualization.

In an example embodiment, the system is configured to display Emojis as pictures.

In yet another example embodiment, an acoustic sensor attached with system which is configured to sense the voice from the user and control, the display of the messages or pictures according the voice command from the user.

In another example embodiment, neon light may be used to generate the shaped pictures to be displayed to the viewers.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present inventive concept have been described above with regard to specific embodiments. These benefits and advantages, and any elements or limitations that may cause them to occur or to become more pronounced are not to be construed as critical, required, or essential features of any or all of the embodiments.

While this specification contains many specific implementation details, these should not be construed as limitations on the scope of any inventive concept of what may be claimed, but rather as descriptions of features that may be specific to particular embodiments of particular inventive concept. Certain features that are described in this specification in the context of separate embodiments can also be implemented in combination in a single embodiment. Conversely, various features that are described in the context of a single embodiment can also be implemented in multiple embodiments separately or in any suitable sub combination.

What is claimed is:

1. A system for an adult costume toy for entertainment, the system comprising:
   a wearable cone shaped housing;
   a plurality of LED lights configured to be controlled by a microprocessor;
   at least one motor configured to be controlled by the microprocessor, and coupled to a propeller, wherein the propeller comprises two blades and the plurality of LED lights are located on the propeller blades;
   a memory coupled to the microprocessor;
   at least one battery configured to supply power to the motor, LED lights, microprocessor and memory;
   a plurality of user interface buttons configured to receive a plurality of user inputs;
   wherein the memory comprises a computer-readable-medium having computer-executable program stored therein that, when executed by the microprocessor, causes the microprocessor to,
   control the rotation of the motor and lighting of the plurality of LED lights to generate a projection of a message on the rotating propeller based on the plurality of user inputs;
   wherein, the memory and microprocessor, and the motor are housed in the cone shaped housing
   wherein the user interface buttons include an on/off button, a control button configured to initiate the display of a cursor and select a desired letter or number, a letter input button configured to scroll through letters of the alphabet, and a number input button configured to scroll through symbols and numbers; and
   wherein the portion of the propeller comprising the LED lights is not housed in the cone shaped housing.

2. The system for an adult costume toy for entertainment as claimed in claim 1, wherein a base diameter of the cone shaped housing is between 6 cm to 20 cm and a height of the cone shaped housing is between 7 cm to 25 cm.

3. The system for an adult costume toy for entertainment as claimed in claim 1, wherein a base of the cone shaped housing comprises plastic adhesive and clips to affix the base of the cone shaped housing to clothing of a user.

4. The system for an adult costume toy for entertainment as claimed in claim 1, wherein the at least one battery is rechargeable.

* * * * *

UNITED STATES PATENT AND TRADEMARK OFFICE
CERTIFICATE OF CORRECTION

| | |
|---|---|
| PATENT NO. | : 9,984,605 B2 |
| APPLICATION NO. | : 15/381103 |
| DATED | : May 29, 2018 |
| INVENTOR(S) | : Sherry Berjeron |

It is certified that error appears in the above-identified patent and that said Letters Patent is hereby corrected as shown below:

In the Specification

Column 5, Line 27, delete "witlessly" and insert --wirelessly--

Signed and Sealed this
Sixth Day of November, 2018

Andrei Iancu
*Director of the United States Patent and Trademark Office*